(12) United States Patent
Weisberg et al.

(10) Patent No.: US 6,351,736 B1
(45) Date of Patent: Feb. 26, 2002

(54) SYSTEM AND METHOD FOR DISPLAYING ADVERTISEMENTS WITH PLAYED DATA

(76) Inventors: Tomer Weisberg, Topaz 24, Caesarea; Etay Baz, Amal 32, Haifa; Assaf Ben Harush, Dulchin 25, Haifa; Lior Cohen, Shtam Benovember 16, Haifa, all of (IL)

( * ) Notice: Subject to any disclaimer, the term of this patent is extended or adjusted under 35 U.S.C. 154(b) by 0 days.

(21) Appl. No.: 09/389,356

(22) Filed: Sep. 3, 1999

(51) Int. Cl.[7] .............................................. G06F 17/60
(52) U.S. Cl. ............................. 705/14; 705/1; 705/26; 705/27; 345/333
(58) Field of Search ................................ 705/1, 14, 50, 705/51, 54, 34, 10, 26, 27; 709/238; 707/11, 13, 100, 101

(56) References Cited

U.S. PATENT DOCUMENTS

| | | | |
|---|---|---|---|
| 5,740,549 A | | 4/1998 | Reilly et al. |
| 5,793,364 A | * | 8/1998 | Bolanos et al. ............. 345/327 |
| 5,890,242 A | | 9/1998 | Shaw et al. |
| 5,838,790 A | | 11/1998 | McAuliffe et al. |
| 5,848,397 A | * | 12/1998 | Marsh et al. .................. 705/14 |
| 5,959,623 A | * | 9/1999 | Van Hoff et al. ............ 345/333 |
| 6,014,502 A | | 1/2000 | Moraes |
| 6,073,105 A | * | 6/2000 | Sutcliffe et al. ................ 705/1 |
| 6,098,106 A | * | 8/2000 | Philyaw et al. ............. 709/238 |
| 6,119,098 A | * | 9/2000 | Guyot et al. .................. 705/14 |
| 6,157,946 A | | 12/2000 | Itakura et al. |

FOREIGN PATENT DOCUMENTS

EP 0817414 * 7/1998

OTHER PUBLICATIONS

Larry Lange, Internet a nickel–and–dime affair, 1995, PP 1–2.*
Marlatt Andrew, Equipping Sites with content and commerce, Feb. 15, 1999, PP 1–2.*
Bradley Oscar, Network and National spot advertising support of commercial television, PP 1–2.*
Bryan John, RightFAX suits heterogeneous networks. Sep. 1995, PP 1.*
Leonard Milt, Interactive TV blends, Aug. 20, 1992, PP 1–2.*
Nov. 28, 2000, Foreign Search Report from PCT/US00/23775.

* cited by examiner

Primary Examiner—Eric W. Stamber
Assistant Examiner—Mussie Tesfamariam (57) ABSTRACT

A method and a system for playing a first type of data, such as audio stream data, for the user while simultaneously displaying an advertisement in the form of a second type of data, such as video data. The system and method enable advertisements to be displayed while music is being played from an audio file by the computer of the user, thereby providing an alternative revenue source for the owner of the rights to the audio data. Furthermore, since the advertisement is in a data format, preferably video data, which is different from that of the audio music file, the display of such an advertisement does not interfere with the enjoyment of the music or other audio data being played.

66 Claims, 2 Drawing Sheets

SYSTEM AND METHOD FOR DISPLAYING ADVERTISEMENTS WITH PLAYED DATA

FIELD AND BACKGROUND OF THE INVENTION

The present invention relates to a system and method for displaying visual advertisements with played data, and in particular, for displaying such advertisements in the format of video data while electronic files containing audio data and/or streaming audio data are played on a computer.

Audio data are stored on many different types of media in many different formats, and are then played by different audio players. Apart from dedicated audio devices such as cassette tape players and CD (compact disc) players, computers can also play audio data, which are stored in the form of electronic files and/or are provided as streaming data. These electronic files and streaming data are highly portable and can easily be transmitted through a network such as the Internet.

Unfortunately, the ease of transport of such data has also increased problems of piracy of recorded music, including unauthorized copying and distribution of such music without the payment of royalties to the owner of the rights to the music. For example, electronic files in the MP3 (MPEG audio layer 3) format can be used to store music in a compact form, which is then readily played by a computer which features a sound device and suitable software. Collections of such files, which have not received any authorization from the owner of the rights to these files, have been found on servers connected to the Internet, although many other such collections are assumed to exist. Since detecting fraud and theft through the Internet is quite difficult, particularly for the protection of such easily copied materials as audio files, a different business model for the sale of audio files through the Internet would be quite useful.

Unfortunately, such a different business model is not available currently. Instead, the technology which is currently available for the distribution of audio files, is now directed, for example, toward increasing the ease of distribution of the data and receiving revenue for such data, for example, for charging for downloading the data, and/or for playing the data. In addition, the current technology also attempts to prevent the unauthorized copying and theft of such data. Given the previously described difficulties with monitoring and policing the Internet, protective technologies may safely be assumed to be vulnerable to attack, since once a weakness in the security protection mechanism has been found, knowledge of such a weakness spreads rapidly through the Internet. Therefore, simply attempting to protect audio files from unauthorized distribution is not a useful solution to the problem of the theft of such data.

A more useful solution would provide an alternative mechanism for handling the unauthorized use of audio data, and more specifically, for the loss of revenues associated with such loss. However, such a solution is not currently available.

There is thus a need for, and it would be useful to have, a method and a system for providing revenue to the owner of the rights without attempting to control the unauthorized distribution of data such as audio data or video data or any other content, which also provides an alternative business model for obtaining revenue from such data, and specifically for obtaining revenue from audio files containing music.

SUMMARY OF THE INVENTION

The present invention is of a method and a system for playing a first type of data, including but not limited to, audio stream data or audio data in an electronic file for example, for the user while simultaneously displaying an advertisement in the form of a second type of data, such as video data for example. The system and method enable advertisements to be displayed while data is played by the computer of the user, for example while music is being played from an audio file by the computer of the user, thereby providing an alternative revenue source for the owner of the rights to the data such as the music. Furthermore, since the advertisement is in a data format, preferably video data, which is different from that of the audio music file, the display of such an advertisement does not interfere with the enjoyment of the music or other audio data being played.

In particular, the present invention is of a method and system for playing any first type of data while displaying the advertisement in the format of a second type of data. By "playing", it is meant that the content of the data is presented to the user by a hardware device, optionally in combination with software. Examples of the first type of data include, but are not limited to, audio data, video data, text data, graphic images and substantially any other form of data. The first type of data should be different from the second type of data in the displayed and/or stored format. Therefore, if the first type of data is audio data, the advertisement is preferably displayed as video data, text data and/or graphic images, or a combination thereof. However, if the first type of data is video data, then the advertisement is preferably displayed as text data, graphic images, any other type of data which is different than the video data, or a combination thereof.

According to the present invention, there is provided a system for playing data of a first data type while displaying an advertisement of a second data type, the first data type being different than the second data type, the system comprising: (a) a user computer for receiving the data of the first data type and the advertisement of the second data type; (b) a first data type display module for driving the user computer for playing the data of the first data type; and (c) an advertisement module for receiving the advertisement of the second data type and for driving the user computer to display the advertisement, such that playing the data of the first data type is coupled to displaying the advertisement. Hereinafter, the term "coupled" refers to a link between playing the data of the first data type and displaying the advertisement, such that playing the data of the first data type triggers the display of the advertisement. The link may include, but is not limited to, simultaneously playing the data of the first data type and the advertisement, and/or retrieving the advertisement from the same source, such as the same server, as the data of the first data type, and/or playing the data of the first data type after or before the advertisement is displayed.

According to another embodiment of the present invention, there is provided a method for playing data of a first data type while displaying an advertisement of a second data type, the first data type being different than the second data type, the method comprising the steps of: (a) providing a user computer for playing the data of the first data type and for displaying the advertisement of the second data type; (b) retrieving the data of the first data type; (c) retrieving the advertisement; (d) simultaneously playing the data of the first data type by the user computer while displaying the advertisement by the user computer; and (e) collecting an amount of revenue according to the step of displaying the advertisement.

Hereinafter, the term "advertisement" refers to promotional data for promoting a particular product, service, individual, company, organization or other promoted item, as well as any other type of data which is pushed or promoted to the user by the operator of a server in a client-server system.

Hereinafter, the term "client" refers to a computer for receiving data, optionally in combination with a software program. Hereinafter, the term "server" refers to a computer for serving data, optionally in combination with a software program.

Hereinafter, the term "Web browser" refers to any software program which can display text, graphics, or both, from Web pages on World Wide Web sites and/or from data stored locally to the computer of the user. Hereinafter, the term "Web page" refers to any document written in a mark-up language including, but not limited to, HTML (hypertext mark-up language) or VRML (virtual reality modeling language), dynamic HTML, XML (extended mark-up language) or related computer languages thereof, as well as to any collection of such documents reachable through one specific Internet address or at one specific World Wide Web site, or any document obtainable through a particular URL (Uniform Resource Locator). Hereinafter, the term "Web site" refers to at least one Web page, and preferably a plurality of Web pages, virtually connected to form a coherent group. Hereinafter, the term "Web server" refers to a computer or other electronic device which is capable of serving at least one Web page to a Web browser.

Hereinafter, the term "video data" includes, but is not limited to, graphic still images, video stream data, animation, and displayed text data. Hereinafter, the term "network" refers to a connection between any two computers which permits the transmission of data.

Hereinafter, the phrase "display a Web page" includes all actions necessary to render at least a portion of the information on the Web page available to the computer user. As such, the phrase includes, but is not limited to, the static visual display of static graphical and/or textual information, the audible production of audio information, the animated visual display of animation and the visual display of video stream data.

Hereinafter, the term "user" refers to the person who operates the system of the present invention by operating a computer, described below as the computer of the user.

Hereinafter, the term "computer" refers to a combination of a particular computer hardware system and a particular software operating system. Examples of such hardware systems include those with any type of suitable data processor. Hereinafter, the term "computer" includes, but is not limited to, personal computers (PC) having an operating system such as DOS, Windows™, OS/2™ or Linux; Macintosh™ computers; computers having JAVA™-OS as the operating system; and graphical workstations such as the computers of Sun Microsystems™ and Silicon Graphics™, and other computers having some version of the UNIX operating system such as AIX™ or SOLARIS™ of Sun Microsystems™; a PalmPilot™, a PilotPC™, or any other handheld device; or any other known and available operating system. Hereinafter, the term "Windows™" includes but is not limited to Windows95™, Windows 3.x™ in which "x" is an integer such as "1", Windows NT™, Windows98™, Windows CE™ and any upgraded versions of these operating systems by Microsoft Corp. (USA).

For the present invention, a software application could be written in substantially any suitable programming language, which could easily be selected by one of ordinary skill in the art. The programming language chosen should be compatible with the computer by which the software application is executed, and in particular with the operating system of that computer. Examples of suitable programming languages include, but are not limited to, C, C++, Delphi™ and Java. Furthermore, the functions of the present invention, when described as a series of steps for a method, could be implemented as a series of software instructions for being operated by a data processor, such that the present invention could be implemented as software, firmware or hardware, or a combination thereof.

DETAILED DESCRIPTION OF THE INVENTION

The present invention is of a method and a system for playing a first type of data, including but not limited to, audio stream data or audio data from an electronic file, for the user while simultaneously displaying an advertisement in the form of a second type of data, such as video stream data. The system and method enable advertisements to be displayed while data is played by the computer of the user, for example while music is being played from an audio file by the computer of the user, thereby providing an alternative revenue source for the owner of the rights to the data such as the music. The revenue is preferably received according to the display of the advertisement to the user. Furthermore, since the advertisement is in a data format, preferably video data, which is different from that of the audio music file, the display of such an advertisement does not interfere with the enjoyment of the music or other audio data being played.

According to preferred embodiments of the present invention, the advertisements are included with the first type of data, including but not limited to, audio data, which are retrieved by the user for playing on the computer of the user. Alternatively and preferably, the advertisements are obtained from a server through a network such as the Internet, separately from the process of retrieving the audio file, and are then optionally stored on the computer of the user. Also alternatively, the advertisements are not stored on the user computer, but rather are streamed from the server for direct display by the user computer whenever the user computer is connected to the network.

In particular, the present invention is of a method and system for playing any first type of data while displaying the advertisement in the format of a second type of data. By "playing", it is meant that the content of the data is presented to the user by a hardware device, optionally in combination with software. Examples of the first type of data include, but are not limited to, audio data, video data, text data, graphic images and substantially any other form of data. The first type of data should be different from the second type of data in the displayed format. Therefore, if the first type of data is audio data, the advertisement is preferably displayed as video data, text data and/or graphic images, or a combination thereof. However, if the first type of data is video data, then the advertisement is preferably displayed as text data, graphic images, any other type of data which is different than the video data, or a combination thereof. By "displaying" it is meant that the data is presented to the user in a suitable format, through a different mechanism than the first type of data is played.

The principles and operation of a system and a method according to the present invention may be better understood with reference to the drawings and the accompanying description, it being understood that these drawings are given for illustrative purposes only and are not meant to be limiting. Although reference is made to audio files as an example of the data to be retrieved, while the advertisements are described only as being in video format, it is understood that the present invention is applicable to any such combination of two different types of data, in which a first type of data is retrieved by the user for playing on the user computer, while the second type of data is used for the display of the advertisements to the user.

Figure 1:
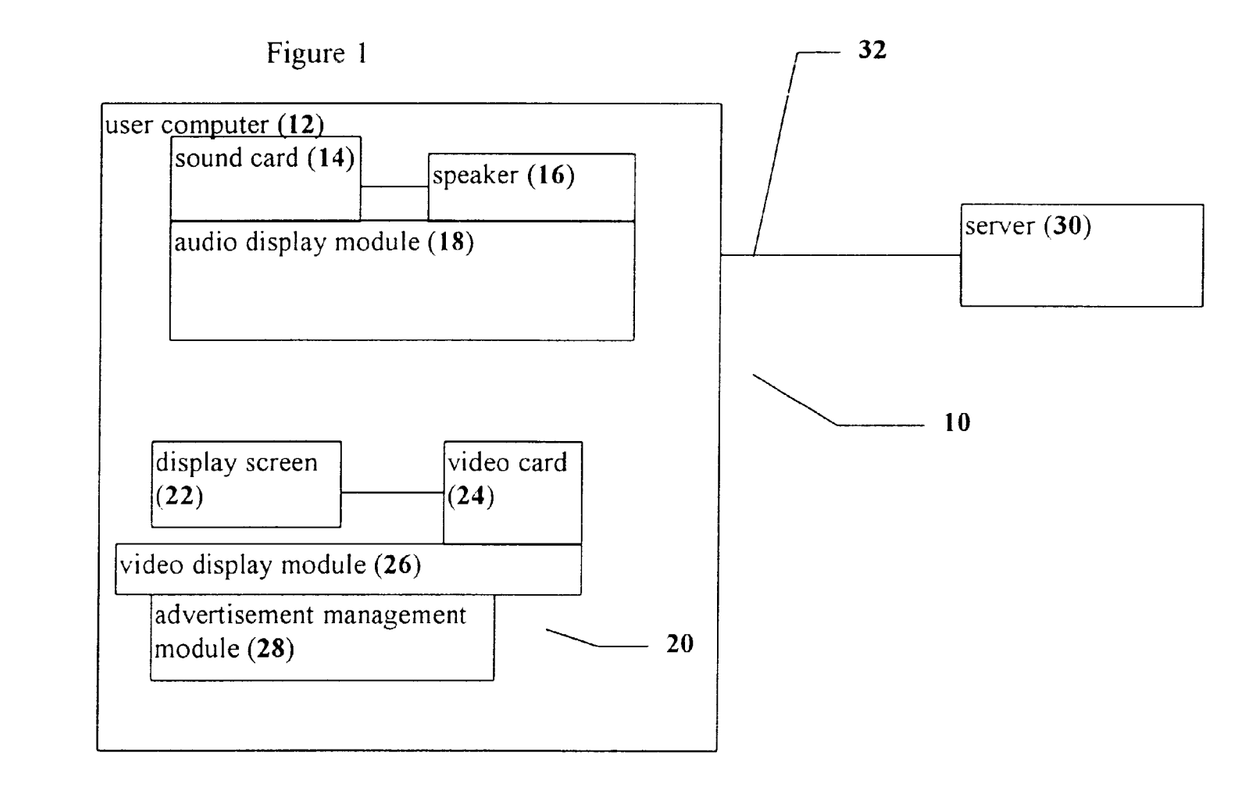
FIG. 1 is a schematic block diagram of a system according to an embodiment of the present invention.

Referring now to the drawings, FIG. 1 is a schematic block diagram of a system according to the present invention. A system 10 features a user computer 12 for playing audio data for the user, such as music contained in an audio file. User computer 12 contains several components which enable such audio data to be played, although it is understood that the exemplary configuration shown could easily be altered and/or replaced by one of ordinary skill in the art. As shown, user computer 12 features a sound card 14 and at least one speaker 16 as the required hardware components for playing audio data. The audio data is preferably stored as an electronic audio file on some type of storage medium which is non-volatile (not shown). The audio data is then retrieved by an audio display module 18, which drives the playing of the data by sound card 14 and at least one speaker 16.

Audio display module 18 is optionally and preferably implemented as an audio codec software program for retrieving and driving the playing of the audio data. Examples of suitable audio display modules 18 include, but are not limited to, WinAmp™ (available from http://www.winamp.com as of Aug. 25, 1999) and RealJukebox™ (available from http://www.real.com as of Aug. 25, 1999). Other suitable audio display modules 18 could easily be selected by one of ordinary skill in the art, although preferably such an audio display module 18 is able to play audio data in a plurality of audio file formats, more preferably including, but not limited to, the MP3 file format, the MIDI (musical instrument digital interface) format and the WAV (digital audio file) format.

As audio display module 18 drives the playing of the audio data, preferably an advertisement module 20 simultaneously causes an advertisement to be displayed as visual data. More preferably such visual data is video data, optionally video stream data. Furthermore, user computer 12 contains several components which enable such video data to be played, although it is understood that the exemplary configuration shown could easily be altered and/or replaced by one of ordinary skill in the art. Advertisement module 20 causes such visual data to be displayed to the user through a display screen 22 connected to a video card 24, which are shown in FIG. 1 as an example only and which are well known in the art.

Preferably, advertisement module 20 features a video display module 26 which drives the display of the video data on display screen 22 by communicating with video card 24. Video display module 26 is preferably implemented as a video codec software program. An example of a suitable video display module 26 is a RealPlayerTm (available from http://www.real.com as of Aug. 25, 1999), although of course one of ordinary skill in the art could easily select such a video display module 26 which is compatible with the present invention.

The selection, retrieval and overall management of the advertisements is preferably provided by an advertisement management module 28. Advertisement management module 28 is preferably implemented as a software program. Advertisement management module 28 first selects the advertisement, for example according to the content of the audio data. Preferably, the audio file which is played by user computer 12 features an advertisement identifier, such that advertisement management module 28 is able to select an advertisement according to the identifier provided with the audio file.

According to preferred embodiments of the present invention, user computer 12 is connected to a server computer 30 through a network 32, which is more preferably the Internet. Although only one server computer 30 is shown, it is understood that a plurality of such server computers could be available without limitation. User computer 12 can then optionally download audio files from server computer 30. In addition, preferably advertisement management module 28 retrieves advertisements from server computer 30 or an alternative computer, according to the advertisement identifier for example. Optionally, the audio files and the advertisements may be retrieved from different server computers 30 (not shown).

The advertisement itself may optionally be stored in user computer 12 in an associated non-volatile storage medium. Alternatively, advertisement management module 28 retrieves the advertisement "on the fly" as required for display when the audio file is played.

Although advertisement module 20 and audio display module 18 are shown as two separate modules, it is understood that this is for the purposes of description only, as these modules have different functionality. However, advertisement module 20 and audio display module 18 could optionally and preferably be packaged as a single component, such as a software program for example, which would perform both sets of functions.

Figure 2:
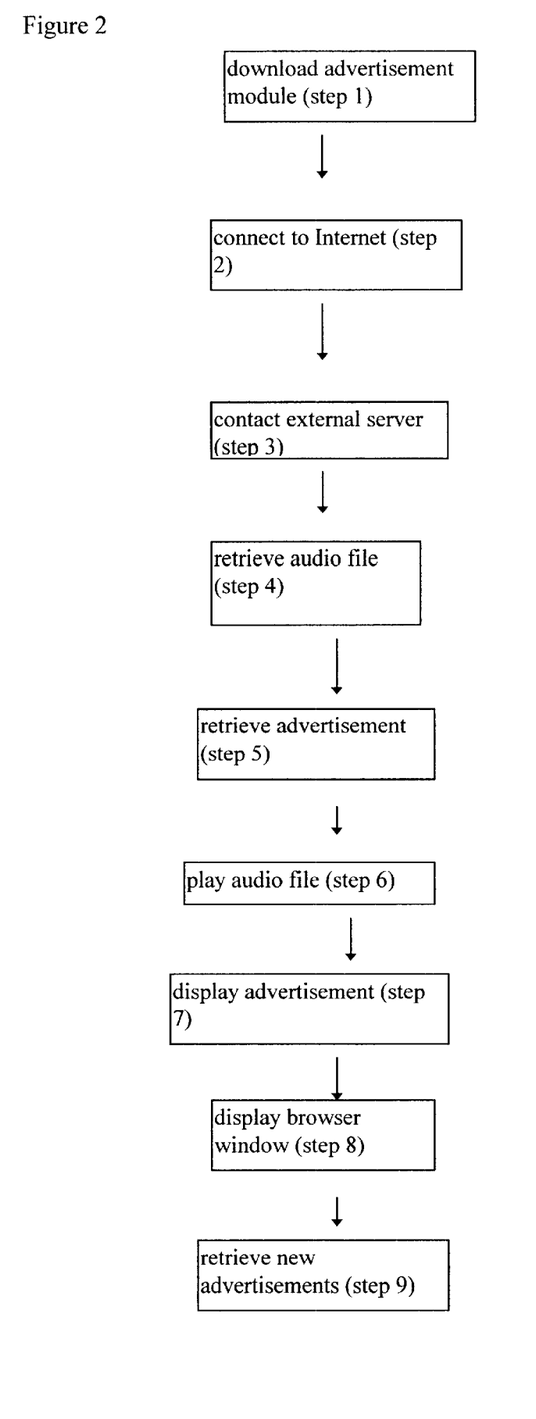
FIG. 2 is a flowchart of an exemplary method according to the present invention.

The operation of system 10 is now described with regard to a particular exemplary method according to the present invention, shown as a flowchart in FIG. 2. In step 1, the advertisement module of FIG. 1 is downloaded to the user computer. Preferably, the advertisement module then installs itself automatically to the user computer. In step 2, the user computer preferably becomes connected to the Internet, which is detected by the advertisement module. In step 3, the advertisement module preferably contacts an external advertisement server and receives a unique user identifier.

In step 4, the user retrieves an audio file or streaming audio data, preferably with at least one advertisement identifier, from an audio server. In step 5, the advertisement module optionally and preferably retrieves at least one advertisement from the external advertisement server according to the identifier. Optionally, the advertisement module is implemented in ActiveX™. The external advertisement server preferably uses an ISAPI DLL (Microsoft Corp., USA) for managing the interaction with the advertisement module. It should be noted that the advertisement server and the audio server are optionally different servers, or alternatively may be implemented as a single server.

In step 6, the audio display module begins to play the audio data, such as an audio file or streaming audio data. It should be noted that steps 5 and 6 could be reversed and/or could be performed substantially simultaneously. In particular, the advertisement could be optionally and preferably downloaded with the audio file as a single component, for example.

In step 7, the advertisement module causes the display screen of the computer to display the advertisement.

Preferably, the advertisement is displayed such that if the user "clicks" or otherwise selects the advertisement with a mouse or other pointing device in step 8, a Web browser is invoked for displaying an associated Web page if the user computer is connected to the Internet.

Otherwise, preferably a window is displayed for requesting the user to connect the user computer to the Internet in order to view the associated Web page. Alternatively and preferably, a GUI (graphical user interface) display may be invoked, in place of, or in addition to, the Web browser, for displaying associated information when the advertisement is selected. The associated information optionally includes but is not limited to, video data, graphical still images, animation, banner displays of text to form a text display, and so forth. In either case, if the user computer is not connected to a network such as the Internet, the displayed window may optionally and preferably interact with the user and receive data through this interaction. The received data may then be optionally and preferably sent through the network when the user computer is next connected.

Optionally and preferably, in step 9, the advertisement module periodically retrieves new advertisements from the external advertisement server when the user computer is connected to the Internet. More preferably, these new advertisements replace previous advertisements, in order to maintain the interest of the user and in order to provide new advertising opportunities for merchants. Most preferably, the advertisement module also reports statistics on how many advertisements were seen by the user, which advertisements were selected by the user and other statistics regarding the program usage.

Revenue is then preferably collected according to the step of displaying the advertisement. For example, the revenue could be charged to the provider of the advertisement, such as a merchant for example, according to the number of times that the advertisement is displayed, the frequency of the rate of the display, characteristics of the user viewing the display such as demographic data about the age of the user and so forth, the collected statistic(s), and/or the type of media in which the advertisement is displayed.

The statistic preferably includes at least one characteristic selected from the group consisting of position for displaying the advertisement, size of the advertisement as displayed, frequency of display, duration of display and content of the advertisement, in which the content more preferably is determined by the type of media such as video data for example.

Thus, the system and method of the present invention provide a new business model for generating revenues from downloaded audio files through the display of advertisements, rather than by attempting to control the distribution of such files.

It will be appreciated that the above descriptions are intended only to serve as examples, and that many other embodiments are possible within the spirit and the scope of the present invention.

What is claimed is:

1. A system for playing data of a first data type while displaying an advertisement of a second data type, the first data type being different than the second data type, the system comprising:
   (a) a user computer for receiving the data of the first data type and the advertisement of the second data type, and for playing the data of the first data type and displaying the advertisement of the second data type;
   (b) a first data type display module for driving said user computer for playing the data of the first data type; and
   (c) an advertisement module for receiving the advertisement of the second data type and for driving said user computer to display the advertisement, such that playing the data of the first data type is coupled to displaying the advertisement.

2. The system of claim 1, wherein the data of the first data type is audio data and the advertisement is visual data.

3. The system of claim 2, wherein said first data type display module is an audio display module and said user computer further comprises a sound card and at least one speaker for displaying said audio data.

4. The system of claim 3, wherein said audio display module is an audio codec software program.

5. The system of claim 2, wherein said audio data is in a format of audio stream data.

6. The system of claim 2, wherein said audio data is in a format of an electronic audio file.

7. The system of claim 2, wherein said visual data is video data, said advertisement module includes a video display module, and said user computer further comprises a video card and a display screen.

8. The system of claim 7, wherein said video display module is a video codec software program.

9. The system of claim 1, further comprising:
   (d) an external server for serving at least the advertisement of the second data type to said user computer; and
   (e) a network for connecting said user computer to said external server.

10. The system of claim 9, wherein said external server also serves said data of the first data type to said user computer.

11. The system of claim 10, wherein the advertisement of the second data type is downloaded with said data of the first data type.

12. The system of claim 10, wherein said advertisement module further comprises an advertisement management module, said advertisement management module retrieving the advertisement from said external server.

13. The system of claim 12, wherein said data of the first data type includes an identifier, such that the advertisement of the second data type is selected by said advertisement management module according to said identifier.

14. The system of claim 13, wherein the advertisement is stored on said user computer.

15. The system of claim 9, wherein said network is the Internet.

16. The system of claim 1, wherein playing the data of the first data type triggers the display of the advertisement.

17. The system of claim 16, wherein the data of the first data type is played before the advertisement is displayed.

18. The system of claim 16, wherein the data of the first data type is played after the advertisement is displayed.

19. A method for playing data of a first data type while displaying an advertisement of a second data type, the first data type being different than the second data type, the method comprising the steps of:
   (a) providing a user computer for playing the data of the first data type and for displaying the advertisement of the second data type;
   (b) retrieving the data of the first data type;
   (c) retrieving the advertisement;
   (d) simultaneously playing the data of the first data type by said user computer while displaying the advertisement by said user computer; and
   (e) collecting an amount of revenue according to the step of displaying the advertisement.

20. The method of claim 19, wherein the data of the first data type is audio data and the advertisement is visual data.

21. The method of claim 20, wherein said user computer is connected to the Internet and step (b) is performed by downloading said audio data as an audio file from the Internet.

22. The method of claim 21, wherein the advertisement is selected according to a content of said audio file.

23. The method of claim 19, wherein step (e) further comprises the step of detecting each time that the advertisement is displayed, such that said amount of revenue is at least partially calculated according to a number of times the advertisement is displayed.

24. The method of claim 19, wherein said user computer is connected to an external server through the Internet, the method further comprising the steps of:
   (f) collecting at least one statistic about at least one performance of step (d);
   (g) transmitting said at least one statistic to said external server from said user computer; and
   (h) at least partially calculating said amount of revenue according to said at least one statistic.

25. The method of claim 24, wherein said at least one statistic includes at least one characteristic selected from the group consisting of position for displaying the advertisement, size of the advertisement as displayed, frequency of display, duration of display and content of the advertisement.

26. The method of claim 19, further comprising the steps of:
   (f) selecting the advertisement by the user; and
   (g) displaying a Web browser when the advertisement is selected.

27. The method of claim 26, wherein the step of selecting the advertisement forms at least one statistic for calculating said amount of said revenue.

28. The method of claim 19, wherein the user computer is intermittently connected to the Internet, the method further comprising the steps of:
   (f) selecting the advertisement by the user;
   (g) displaying a GUI (graphical user interface) when the advertisement is selected if said user computer is not currently connected to the Internet;
   (h) performing at least one interaction with the user through said GUI;
   (i) connecting said user computer to the Internet; and
   (j) sending a result of said at least one interaction through the Internet.

29. The method of claim 28, wherein the step of selecting the advertisement forms at least one statistic for calculating said amount of said revenue.

30. A system for displaying data of a first data set in conjunction with displaying an advertisement of a second data set, the system comprising:
   (a) a user computer for receiving the data of the first data set and the advertisement of the second data set, and for displaying the data of the first data set and displaying the advertisement of the second data set;
   (b) a first data set display module for driving said user computer for displaying the data of the first data set; and
   (c) an advertisement module for receiving the advertisement of the second data set and for driving said user computer to display the advertisement of the second data set, such that displaying the data of the first data set is coupled to displaying the advertisement of the second data set.

31. The system of claim 30, wherein the data of the first data set and the data of the second data set each include at least one of audio data, visual data and application program data, and at least one type of data distinct from the data included in the other data set.

32. The system of claim 31, wherein said audio data refers to a file format selected from at least one of the MP3 file format, the MIDI (musical instrument digital interface) format, and the WAV (digital audio file) format.

33. The system of claim 31, wherein said visual data is selected from at least one of text, at least one still image, at least one animated image, at least one video image, textural information, and information pertaining to position on a display device of said user computer.

34. The system of claim 31, wherein at least one of said first data set display module and said advertisement module is an audio display module, and said user computer further comprises a sound card and at least one speaker for displaying audio data.

35. The system of claim 34, wherein said audio display module is an audio codec software program.

36. The system of claim 31, wherein said audio data is in a format of audio stream data.

37. The system of claim 31, wherein said audio data is in a format of an electronic audio file.

38. The system of claim 31, wherein said visual data is video data, said advertisement module includes a video display module, and said user computer further comprises a video card and a display screen.

39. The system of claim 38, wherein said video display module is a video codec software program.

40. The system of claim 30, further comprising:
   (d) an external server for serving at least the advertisement of the second data set to said user computer; and
   (e) a network for connecting said user computer to said external server.

41. The system of claim 40, wherein said external server also serves said data of the first data set to said user computer.

42. The system of claim 41, wherein the advertisement of the second data set is downloaded with said data of the first data set.

43. The system of claim 40, wherein said advertisement module further comprises an advertisement management module, said advertisement management module retrieving the advertisement from said external server.

44. The system of claim 43, wherein said data of the first data set includes an identifier, such that the advertisement of the second data set is selected by said advertisement management module according to said identifier.

45. The system of claim 40, wherein the advertisement of the second data set is stored in said user computer.

46. The system of claim 40, wherein said network is the Internet.

47. The system of claim 30, wherein a command to play the data of the first data set triggers at least one of:
   (i) the display of the second data set prior to displaying the data of the first set;
   (ii) the display of the second data set after displaying the data of the first set; and
   (iii) the display of the second data set during the display of the data of the first set.

48. A method for displaying data of a first data set and displaying an advertisement of a second data set, the method comprising the steps of:

(a) providing a user computer for displaying the first data set and for displaying the advertisement of the second data set;

(b) retrieving the data of the first data set and the advertisement of the second data set by the user computer;

(c) displaying the data of the first data set and the advertisement of the second data set by the user computer; and (d) collecting an amount of revenue according to the step of displaying the advertisement of the second data set.

49. The method of claim 48, wherein the data of the first data set and the data of the second data set each include at least one of audio data, visual data, and application program data, and at least one type of data distinct from the data included in the other data set.

50. The method of claim 49, wherein said audio data refers to a file format selected from at least one of the MP3 file format, the MIDI (musical instrument digital interface) format, and the WAV (digital audio file) format.

51. The method of claim 49, wherein said visual data is selected from at least one of text, at least one still image, at least one animated image, at least one video image, textural information, and information pertaining to position on a display device of said user computer.

52. The method of claim 49, wherein said user computer is connected to the Internet and said audio data is downloaded as an audio file from the Internet.

53. The method of claim 52, wherein the advertisement of the second data set is selected according to a content of said audio file.

54. The method of claim 53, further comprising the step of detecting each time that the advertisement of the second data set is displayed, such that said amount of revenue is at least partially calculated according to a number of times the advertisement of the second data set is displayed.

55. The method of claim 48, wherein said user computer is connected to an external server through the Internet, the method further comprising the steps of:

(e) collecting at least one statistic about at least one performance of step (c);

(f) transmitting said at least one statistic to said external server from said user computer; and (g) at least partially calculating said amount of revenue according to said at least one statistic.

56. The method of claim 55, wherein said at least one statistic includes at least one of a position for displaying the advertisement, a size of the advertisement as displayed, a frequency of display, a duration of display and content of the advertisement.

57. The method of claim 55, further comprising the steps of:

(h) selecting the advertisement by the user; and (i) displaying a Web browser when the advertisement is selected.

58. The method of claim 57, wherein the step of selecting the advertisement forms at least one statistic for calculating said amount of said revenue.

59. The method of claim 55, wherein the user computer is intermittently connected to the Internet, the method further comprising the steps of:

(h) selecting the advertisement by the user;

(i) displaying a GUI (graphical user interface) when the advertisement is selected if said user computer is not currently connected to the Internet;

(j) performing at least one interaction with the user through said GUI;

(k) connecting said user computer to the Internet; and (l) sending a result of said at least one interaction through the Internet.

60. The method of claim 59, wherein the step of selecting the advertisement forms at least one statistic for calculating said amount of said revenue.

61. A system for presenting data of a first data type while presenting advertising data of a second data type, the data of the first data type having at least one difference from the advertising data of the second data type, the system comprising:

(a) a receiver, the receiver receiving the data of the first data type and the advertising data of the second data type;

(b) a presenting unit coupled to the receiver, the presenting unit coupling the presentation of the data of the first data type to the presentation of the advertising data of the second data type.

62. The system of claim 61, wherein the advertising data of the second data type is presented at least one of concurrently with, before, and after presentation of the data of the first data type.

63. The system of claim 61, wherein the presenting unit includes a first presenting module and a second presenting module, the first presenting module presenting the data of the first data type, and the second presenting module presenting the advertising data of the second data type.

64. A method for presenting data of a first data type and presenting advertising data of a second data type, comprising the steps of:

(a) downloading the data of a first data type;

(b) downloading the advertising data of the second data type;

(c) generating a first command for the presentation of the data of the first data type;

(d) presenting the data of the first data type;

(e) generating a second command for the presentation of the advertising data of the second data type based on at least one of the first command and the presentation of the data of the first data type; and (f) presenting the advertising data of the second data type.

65. The system of claim 1, wherein the data of the first data type includes data other than an update to the system programming.

66. The method of claim 19, wherein the user computer is intermittently connected to the Internet, the method further comprising the steps of:

(f) selecting the advertisement by the user;

(g) displaying a GUI (graphical user interface) when the advertisement is selected if said user computer is not currently connected to the Internet;

(h) performing at least one interaction with the user through said GUI.

* * * * *

UNITED STATES PATENT AND TRADEMARK OFFICE
CERTIFICATE OF CORRECTION

| | | |
|---|---|---|
| PATENT NO. | : 6,351,736 B1 | |
| APPLICATION NO. | : 09/389356 | |
| DATED | : February 26, 2002 | |
| INVENTOR(S) | : Tomer Weisberg et al. | |

It is certified that error appears in the above-identified patent and that said Letters Patent is hereby corrected as shown below:

Claim 1, Column 8, Lines 1-5, the claim language:
"(c) an advertisement module for receiving the advertisement of the second data type and for driving said user computer to display the advertisement, such that playing the data of the first data type is coupled to displaying the advertisement."
should read
--(c) an advertisement module for receiving the advertisement of the second data type and for driving said user computer to display the advertisement, such that the advertisement being automatically displayed based on playing the data of the first data type.--

Claim 19, Column 8, Lines 63-65, the claim language:
"(d) simultaneously playing the data of the first data type by said user computer while displaying the advertisement by said user computer;"
should read
--(d) displaying of the advertisement by said user computer depending from playing the data of the first data type by said user computer;--

Claim 30, Column 9, Line 64 – Column 10, Line 2, the claim language:
"(c) an advertisement module for receiving the advertisement of the second data set and for driving said user computer to display the advertisement of the second data set, such that displaying the data of the first data set is coupled to displaying the advertisement of the second data set."
should read
--(c) an advertisement module for receiving the advertisement of the second data set and for driving said user computer to display the advertisement of the second data set, such that the advertisement of the second data set being automatically displayed based on displaying the data of the first data set.--

Signed and Sealed this
Fifteenth Day of March, 2011

David J. Kappos
*Director of the United States Patent and Trademark Office*

CERTIFICATE OF CORRECTION (continued)
U.S. Pat. No. 6,351,736 B1

Claim 48, Column 11, Lines 6-8, the claim language:
"(c) displaying the data of the first data set and the advertisement of the second data set by the user computer;"
should read
--(c) displaying of the advertisement of the second data set by the user computer depending from the data of the first data set;--

Claim 61, Column 12, Line 20-23, the claim language:
"(b) a presenting unit coupled to the receiver, the presenting unit coupling the presentation of the data of the first data type to the presentation of the advertising data of the second data type."
should read
--(b) a presenting unit coupled to the receiver, the presenting unit coupling the presentation of the data of the first data type to the presentation of the advertising data of the second data type, such that the advertisement of the second data set being automatically presented based on presentation of the data of the first data set.--